(12) United States Patent
Bae et al.

(10) Patent No.: US 11,472,302 B2
(45) Date of Patent: Oct. 18, 2022

(54) CHARGING INLET ASSEMBLY OF VEHICLE

(71) Applicants: HYUNDAI MOTOR COMPANY, Seoul (KR); KIA MOTORS CORPORATION, Seoul (KR)

(72) Inventors: JinGeun Bae, Daegu (KR); Young Chan Byun, Hwaseong-si (KR); Gibum Kim, Pohang-si (KR); Hyeonjun Kim, Siheung-si (KR); Ki Bum La, Seoul (KR); Kyungsu Kim, Asan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 72 days.

(21) Appl. No.: 17/176,518

(22) Filed: Feb. 16, 2021

(65) Prior Publication Data
US 2022/0089047 A1  Mar. 24, 2022

(30) Foreign Application Priority Data

Sep. 22, 2020  (KR) .......................... 10-2020-0122149

(51) Int. Cl.
*B60L 53/16* (2019.01)
*B60L 50/60* (2019.01)
(52) U.S. Cl.
CPC .............. *B60L 53/16* (2019.02); *B60L 50/60* (2019.02)

(58) Field of Classification Search
CPC ........................................................ B60L 53/16
USPC .......................................................... 320/109
See application file for complete search history.

(56) References Cited

U.S. PATENT DOCUMENTS

| 5,501,607 | A | * | 3/1996 | Yoshioka | .............. | E05D 11/105 220/259.2 |
| 8,206,184 | B2 | * | 6/2012 | Kwasny | .................. | B60L 53/16 439/923 |
| 2011/0034053 | A1 | * | 2/2011 | Matsumoto | ........... | B60L 53/305 439/304 |
| 2015/0197157 | A1 | * | 7/2015 | Nakajima | ............... | B60L 50/66 439/352 |
| 2015/0343913 | A1 | * | 12/2015 | Fukai | ...................... | B60L 53/16 74/530 |

FOREIGN PATENT DOCUMENTS

JP          5664515 B2     2/2015

* cited by examiner

*Primary Examiner* — Jerry D Robbins
(74) *Attorney, Agent, or Firm* — Lempia Summerfield Katz LLC; Seung-Hyun Jang (57) ABSTRACT

The charging inlet assembly may include: a charging inlet provided at a predetermined position of the vehicle; a charging connector detachably coupled to the charging inlet; a supporting plate covering at least a rear surface of the charging inlet; a supporting rod extending from the supporting plate toward the charging inlet and configured to be coupled to the charging inlet; and at least one elastic member elastically connecting the charging inlet and the supporting plate.

6 Claims, 6 Drawing Sheets

CHARGING INLET ASSEMBLY OF VEHICLE

CROSS-REFERENCE TO RELATED APPLICATION

This application claims priority to and the benefit of Korean Patent Application No. 10-2020-0122149, filed on Sep. 22, 2020, the entire contents of which are incorporated herein by reference.

FIELD

The present disclosure relates to a charging inlet assembly of a vehicle.

BACKGROUND

The statements in this section merely provide background information related to the present disclosure and may not constitute prior art.

Due to recently strengthened environmental regulations and fuel efficiency regulations, use of environment-friendly vehicles such as hybrid vehicles and electric vehicles is increasing. According to environment-friendly vehicles, it is very important to secure a capacity of a high voltage battery because the vehicles are mainly driven by a motor instead of an engine. For hybrid vehicles, the high voltage battery is charged by driving the engine, whereas for electric vehicles, the high voltage battery is charged by an external power source.

For charging the high voltage battery, the electric vehicle is equipped with a charging inlet. When the charging connector connected to the external power source is connected to the charging inlet, electrical energy is supplied from the external power source to the high voltage battery and the high voltage battery is charged.

According to conventional arts, the charging inlet is fixed to a vehicle body by fixing means such as bolts. Recently, as the capacity of the high voltage battery of the electric vehicle increases and the used voltage increases, a capacity of a charging device is also increasing. Accordingly, a capacity and load of a charging cable connecting the charging device and the external power source are increasing. Increase of the capacity of the charging device and the load of the charging cable may generate a large torque applied to the charging device when the charging device and charging inlet are coupled. Accordingly, the charging device may be spaced apart from the charging inlet at an upper portion of the charging inlet and a proximity detection (PD) button may be pressed, so that charging may be stopped.

The above information disclosed in this Background section is only for enhancement of understanding of the background of the disclosure, and therefore it may contain information that does not form the prior art that is already known to a person of ordinary skill in the art.

SUMMARY

The present disclosure provides a charging inlet assembly of a vehicle having advantages of reducing torque due to a load of a charging connector and a tension of a charging cable by allowing the charging inlet to rotate by a predetermined angle when the charging connector is coupled to the charging inlet.

A charging inlet assembly of a vehicle according to one form of the present disclosure may include: a charging inlet provided at a predetermined position of the vehicle; a charging connector detachably coupled to the charging inlet; a supporting plate covering at least a rear surface of the charging inlet; a supporting rod extending from the supporting plate toward the charging inlet and configured to be coupled to the charging inlet; and at least one elastic member elastically connecting the charging inlet and the supporting plate.

The supporting rod may be coupled to the rear surface of the charging inlet such that the charging inlet may rotate upwardly or downwardly.

When the charging connector is coupled to the charging inlet, the charging inlet may rotate downwardly from an initial position by downward torque caused by force applied to the charging inlet by the charging connector, and the at least one elastic member may apply elastic force to the charging inlet against the force applied to the charging inlet by the charging connector.

A normal line of a front surface of the charging inlet may coincide with a horizontal line or be inclined upwardly from the horizontal line.

When the charging connector is coupled to the charging inlet, the downward torque caused by the force applied to the charging inlet by the charging connector and an upward torque caused by the elastic force of the at least one elastic member may be balanced, so that the normal line of the front surface of the charging inlet stops in a state inclined downwardly from the horizontal line.

An angle $\theta 1$ between the normal line of the front surface of the charging inlet and the horizontal line at the initial position may be smaller than an angle $\theta 2$ between the normal line of the front surface of the charging inlet and the horizontal line at a position at which the normal line of the front surface of the charging inlet stops in the state inclined downwardly from the horizontal line.

According to one form of the present disclosure, the charging connector may be inhibited from being spaced apart from the charging inlet by allowing the charging inlet to rotate when the charging connector is coupled to the charging inlet. Accordingly, unexpected stopping of charging may be inhibited.

In addition, since a rotation of the charging inlet is limited to a predetermined angle or less by using an elastic member, it is possible to inhibit the charging connector from being unintentionally detached from the charging inlet.

In addition, other effects of various forms of the present disclosure should be directly or implicitly described in the description provided herein. Various effects predicted according to various forms of the present disclosure will be disclosed in the description provided herein.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

The terminology used herein is for the purpose of describing particular forms only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle", "vehicular", or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, a hybrid vehicle is a vehicle that has two or more sources of power, for example both gasoline-based power and electric-based power (e.g., a hybrid electric vehicle (HEV)).

Figure 1:
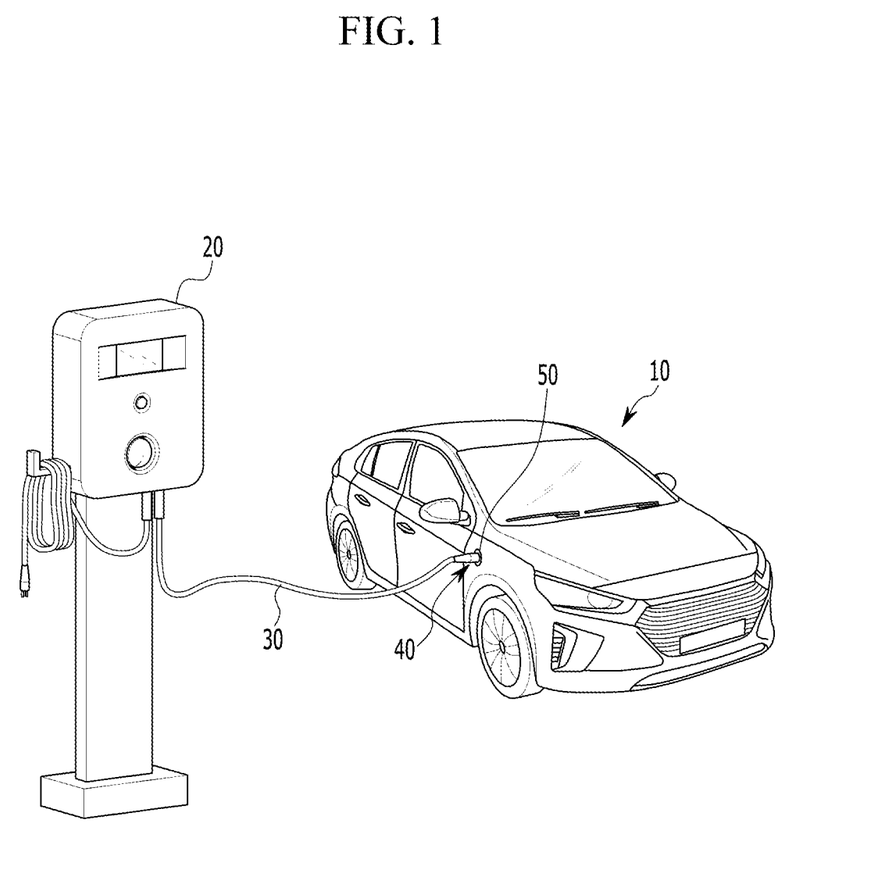
FIG. 1 is a schematic diagram showing a state in which the electric vehicle is being charged.
Figure 2:
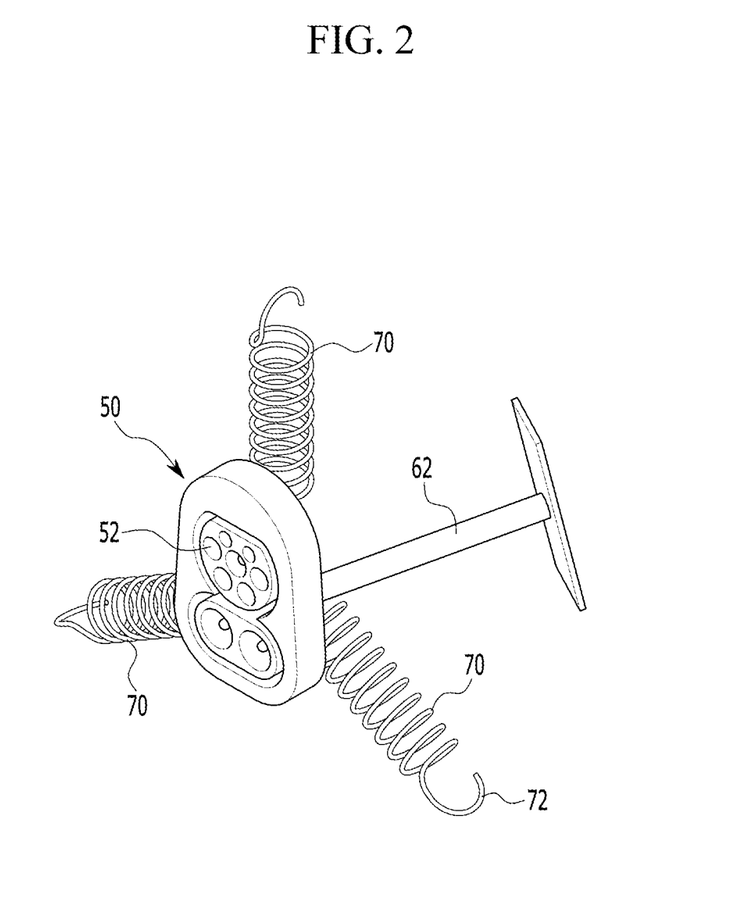
FIG. 2 is a schematic diagram showing a charging inlet and a charging connector according to one form of the present disclosure.

FIG. 1 is a schematic diagram showing a state in which the electric vehicle is being charged, and FIG. 2 is a schematic diagram showing a charging inlet and a charging connector according to one form of the present disclosure.

As shown in FIG. 1, a vehicle 10 is provided with a charging inlet 50 at a predetermined position. The charging inlet 50 is electrically connected to a battery (not shown) equipped in the vehicle 10, and a charging connector 40 electrically connected to the charging stand 20 through a charging cable 30 can be detachably coupled to the charging inlet 50. The charging stand 20 is an example of external power sources that supply DC power obtained by converting commercial AC power. When the charging connector 40 connected to the charging cable 30 of the charging stand 20 is coupled to the charging inlet 50, electrical energy is supplied to the battery to charge the battery.

As shown in FIG. 2, a charging terminal 42 is protruded from an end of the charging connector 40, and a vehicle terminal 52 corresponding to the charging terminal 42 is provided at the charging inlet 50. When the charging terminal 42 is coupled to the vehicle terminal 52, the electrical energy of the charging stand 20 is supplied to the battery. Shapes of the charging terminal 42 and the vehicle terminal 52 may vary depending on charging standards supported by the vehicle 10.

Figure 3:
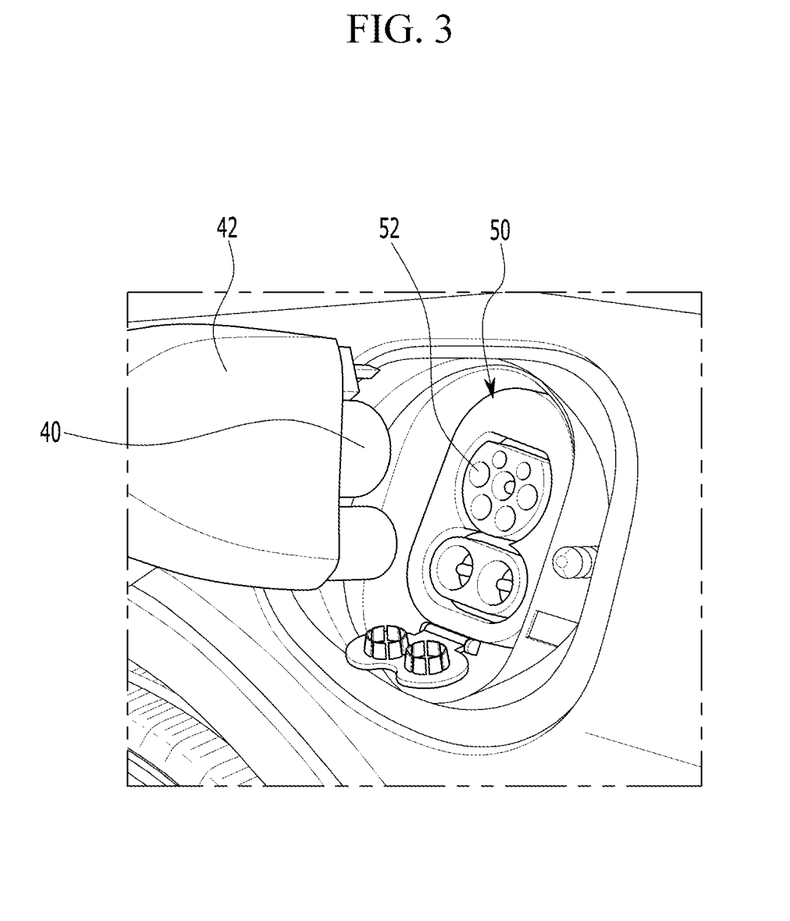
FIG. 3 is a perspective view showing a charging inlet assembly according to one form of the present disclosure.
Figure 4:
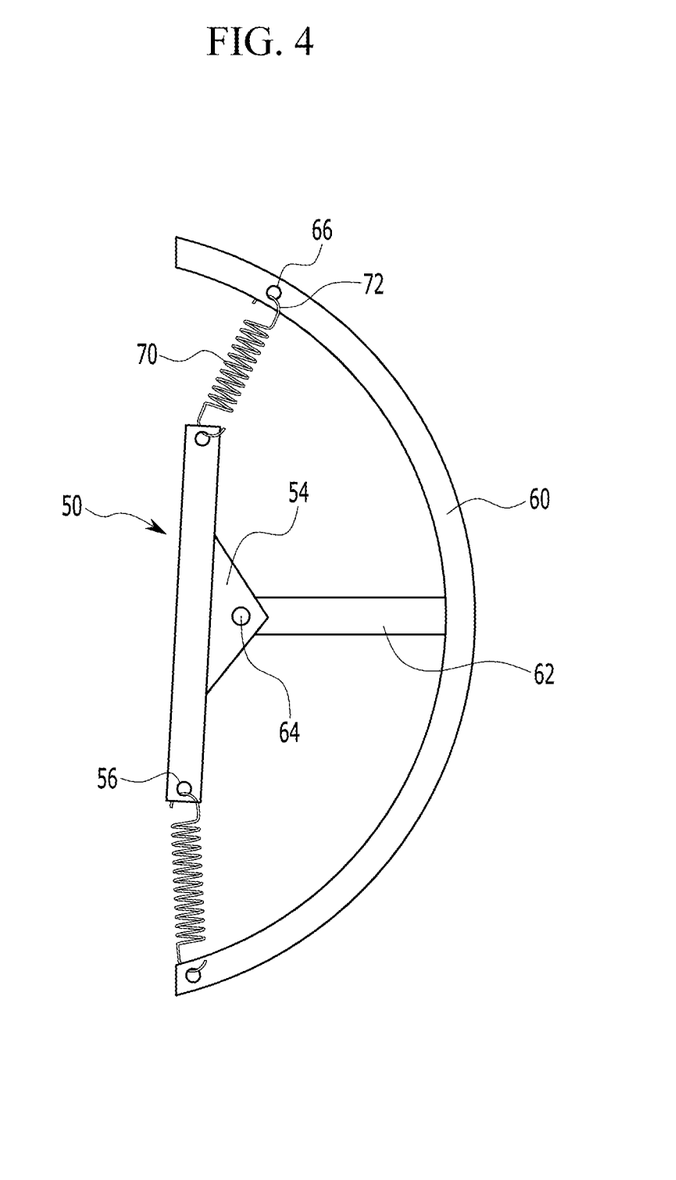
FIG. 4 is a cross-sectional view showing a charging inlet assembly according to one form of the present disclosure.

FIG. 3 is a perspective view showing a charging inlet assembly according to one form of the present disclosure, and FIG. 4 is a cross-sectional view showing a charging inlet assembly according to one form of the present disclosure.

As shown in FIG. 3 and FIG. 4, the charging inlet assembly includes the charging inlet 50, a supporting plate 60, a supporting rod 62, and at least one elastic member 70.

As described above, the charging inlet 50 is provided with the vehicle terminal 52 at a front surface thereof to which the charging terminal 42 of the charging connector 40 is coupled. A coupling portion 54 may be formed on a rear surface of the charging inlet 50, and at least one inlet coupling hole 56 may be formed at a predetermined position of the charging inlet 50. The number of the inlet coupling holes 56 may correspond to the number of the elastic members 70.

The supporting plate 60 may be fixed to the vehicle body of the vehicle 10 or be a part of the vehicle body. A front surface of the supporting plate 60 covers at least the rear surface of the charging inlet 50. In one example, the front surface of the supporting plate 60 may be formed in a hemispherical or semi-ellipsoid to facilitate rotation of the charging inlet 50. The front surface of the supporting plate 60 is connected to the coupling portion 54 of the charging inlet 50 through the supporting rod 62. Therefore, when a user couples the charging connector 40 to the charging inlet 50, the supporting plate 60 inhibits the charging inlet 50 from being pushed rearward. Therefore, the charging connector 40 can be easily coupled to the charging inlet 50. At least one supporting plate coupling hole 66 may be formed at a predetermined position of the supporting plate 60. The number of the supporting plate coupling holes 66 may correspond to the number of the elastic members 70.

The supporting rod 62 extends from the front surface of the supporting plate 60 toward the charging inlet 50. A front end portion of the supporting rod 62 functions as a rotation center of the charging inlet 50. To this end, the front end portion of the supporting rod 62 may be coupled to the coupling portion 54 of the charging inlet 50 through a pin 64. The pin 64 couples the supporting rod 62 to the charging inlet 50 so that the charging inlet 50 is rotatable upwardly or downwardly. Herein, the pin 64 is exemplified as coupling means of the charging inlet 50 and the supporting rod 62, but the coupling means is not limited to the pin 64. Various coupling means known to a person of an ordinary skill in the art until now can be used to couple the supporting rod 62 and the charging inlet 50 so that the charging inlet 50 is rotatable around the pin 64. The supporting rod 62 supports the rear surface of the charging inlet 50 to inhibit the charging inlet 50 from being pushed to the rear, and allows the charging inlet 50 to rotate around the pin 64 such that the charging inlet 50 may move upwardly or downwardly.

The at least one elastic member 70 elastically connects the charging inlet 50 to the supporting plate 60. When the charging connector 40 is coupled to the charging inlet 50, the charging inlet 50 rotates around the pin 64 and moves downwardly by a load of the charging connector 40 and a tension of the charging cable 30. The at least one elastic member 70 inhibits the charging connector 40 from being unintentionally detached from the charging inlet 50 by limiting the rotation of the charging inlet 50 to a predetermined angle or less. In addition, the at least one elastic member 70 rotates the charging inlet 50 to an initial position when the charging connector 40 is detached from the charging inlet 50. That is, the charging inlet 50 is rotated upwardly with respect to the pin 64. If the charging inlet 50 does not rotate to the initial position (i.e., if a normal line of the front surface of the charging inlet 50 is inclined downwardly from a horizontal line), the user must tilt the end of the charging connector 40 upwardly to couple the charging inlet 50 to the charging connector 40 when next charging, which may cause inconvenience to the user. To inhibit such user's inconveniences, the at least one elastic member 70 provides an elastic force that rotates the charging inlet 50 to the initial position. Here, the initial position of the charging inlet 50 may be a position in which the normal line of the front surface of the charging inlet 50 coincides with the horizontal line or is inclined upwardly from the horizontal line.

Hooks 72 may be formed at both ends of the elastic member 70. The hook 72 at an end of the elastic member 70 is inserted into the inlet coupling hole 56 and the hook 72 at the other end of the elastic member 70 is inserted into the supporting plate coupling hole 66 such that the elastic member 70 elastically connects the charging inlet 50 to the supporting plate 60. However, the coupling means formed at the both ends of the elastic member 70 are not limited to the hooks 72. Various coupling means known to a person of an ordinary skill in the art until now can be used, which is fixedly attached to the charging inlet 50 and the supporting plate 60 to stably apply the elastic force to the charging inlet 50.

Three elastic members 70 are illustrated in this specification. When the three elastic members 70 are used, a first elastic member 70 may be connected to an upper center of the charging inlet 50, and second and third elastic members 70 may be connected to both sides of a lower end of the charging inlet 50, respectively. In addition, the first elastic member 70 may be disposed inclined to the rear, and the second and the third elastic members 70 may be disposed inclined to the front. However, the number and the arrangement of the elastic members 70 are not limited to the number and the arrangement shown in FIG. 3 and FIG. 4. The number and the arrangement of the elastic members 70 may be any number and arrangement suitable for generating upward torque against downward torque caused by the load of the charging connector 40 and the load of the charging cable 30 by a resulting force of the elastic members 70. In one example, one elastic member 70 may be used, and the one elastic member 70 may be connected to the upper center of the charging inlet 50 and be disposed inclined to the rear. In another example, two elastic members 70 may be used, the first elastic member 70 may be connected to the upper center of the charging inlet 50 and be disposed inclined to the rear, and the second elastic member 70 may be connected to a lower center of the charging inlet 50 and be disposed inclined to the front.

Hereinafter, referring to FIG. 5 and FIG. 6, an operation of the charging inlet assembly according to one form of the present disclosure will be described in detail.

Figure 5:
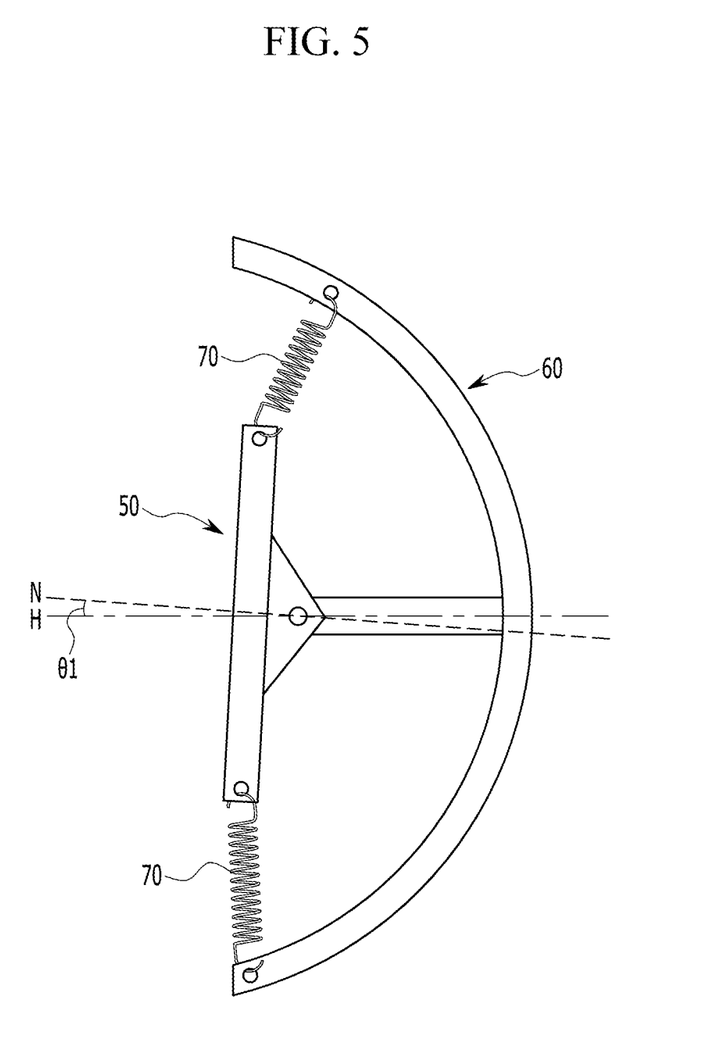
FIG. 5 is a schematic diagram showing a state in which the charging connector is not coupled to the charging inlet assembly according to one form of the present disclosure.
Figure 6:
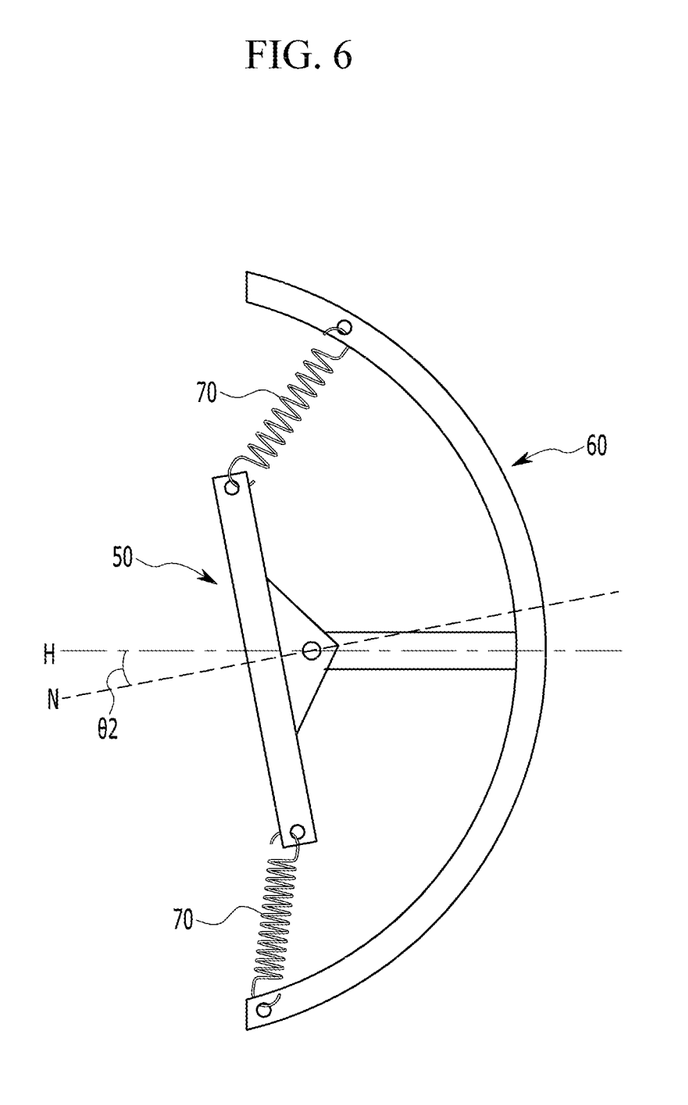
FIG. 6 is a schematic diagram showing a state in which a charging connector is coupled to a charging inlet assembly according to one form of the present disclosure.

FIG. 5 is a schematic diagram showing a state in which the charging connector is not coupled to the charging inlet assembly according to one form of the present disclosure, and FIG. 6 is a schematic diagram showing a state in which a charging connector is coupled to a charging inlet assembly according to one form of the present disclosure. In FIG. 6, the charging connector 40 has been omitted for convenience of description.

As shown in FIG. 5, when the charging connector 40 is not coupled to the charging inlet assembly, the charging inlet 50 is positioned at the initial position. In order for the user to easily couple the charging connector 40 to the charging inlet assembly, the front surface of the charging inlet 50 may be disposed horizontally or inclined upwardly at the initial position of the charging inlet 50. In one example, although not limited thereto, the normal line N of the front surface of the charging inlet 50 may coincide with the horizontal line H or be inclined upwardly from the horizontal line H. An angle θ1 between the normal line N of the front surface of the charging inlet 50 and the horizontal line H may be predetermined by a designer, and a modulus of elasticity, a length, and the arrangement of the at least one elastic member 70 may be determined based on the predetermined angle θ1.

When the charging connector 40 is coupled to the charging inlet assembly, a torque that rotates the charging inlet 50 downwardly is generated by the load of the charging connector 40 and the tension of the charging cable 30. Accordingly, the normal line N of the front surface of the charging inlet 50 begins to be inclined downwardly from the horizontal line H. At the same time, the length of the elastic member 70 increases and the elastic member 70 applies the elastic force to the charging inlet 50 against the load of the charging connector 40 and the tension of the charging cable 30. That is, the elastic force applied by the elastic member 70 to the charging inlet 50 generates a torque to return the charging inlet 50 to the initial position.

If a downward rotation of the charging inlet 50 is small, the downward torque due to the tension and the load is greater than the upward torque due to the elastic force, so that the charging inlet 50 continues to rotate downwardly. As the downward rotation of the charging inlet 50 increases, the elastic force of the elastic member 70 increases and the downward torque due to the load and the tension decreases. Therefore, when the charging inlet 50 is rotated downwardly by a predetermined angle, the downward torque due to the tension and the load is balanced with the upward torque due to the elastic force. That is, as shown in FIG. 6, the front surface of the charging inlet 50 stops in a state inclined downwardly. In one example, the normal line N of the front surface of the charging inlet 50 is inclined downwardly from the horizontal line H, and an angle θ2 between the normal line N of the front surface of the charging inlet 50 and the horizontal line H may be greater than 0°, but be not limited thereto. The angle θ2 between the normal line N of the front surface of the charging inlet 50 and the horizontal line H may be predetermined by the designer, and the modulus of elasticity, the length, and the arrangement of the at least one elastic member 70 may be determined based on the predetermined angle θ2. In one example, the angle θ1 between the normal line N of the front surface of the charging inlet 50 and the horizontal line H at the initial position may be smaller than the angle θ2 between the normal line N of the front surface of the charging inlet 50 and the horizontal line H at a position at which the normal line N of the front surface of the charging inlet 50 stops inclined downwardly from the horizontal line H.

After that, when the charging connector 40 is detached from the charging inlet 50, the charging inlet 50 is rotated upwardly to the initial position by the elastic member 70. Accordingly, when the next charging, the user can conveniently couple the charging connector 40 to the charging inlet assembly.

According to one form of the present disclosure, when the charging connector 40 is coupled to the charging inlet assembly, the charging inlet 50 rotates together with the charging connector 40. Therefore, the charging connector 40 is not spaced from the charging inlet 50.

Further, the rotation of the charging inlet 50 can be limited to a predetermined angle or less by the elastic member 70, and the charging inlet 50 can be returned to the initial position when the charging connector 40 is detached from the charging inlet assembly.

While this disclosure has been described in connection with what is presently considered to be practical exemplary forms, it is to be understood that the disclosure is not limited to the disclosed embodiments. On the contrary, it is intended to cover various modifications and equivalent arrangements included within the spirit and scope of the appended claims.

What is claimed is:

1. A charging inlet assembly of a vehicle, comprising:
   a charging inlet provided at a predetermined position of the vehicle;
   a charging connector detachably coupled to the charging inlet;
   a supporting plate covering at least a rear surface of the charging inlet;
   a supporting rod extending from the supporting plate toward the charging inlet and configured to be coupled to the charging inlet; and
   at least one elastic member elastically connecting the charging inlet and the supporting plate.

2. The charging inlet assembly of claim 1, wherein the supporting rod is coupled to the rear surface of the charging inlet and the charging inlet is configured to rotate while moving upwardly or downwardly.

3. The charging inlet assembly of claim 2, wherein, when the charging connector is coupled to the charging inlet, the charging inlet moves downwardly from an initial position by a downward torque caused by a force applied to the charging inlet by the charging connector, and the at least one elastic member applies an elastic force to the charging inlet against the force applied to the charging inlet by the charging connector.

4. The charging inlet assembly of claim 3, wherein a normal line of a front surface of the charging inlet coincides with a horizontal line or is inclined upwardly from the horizontal line.

5. The charging inlet assembly of claim 4, wherein when the charging connector is coupled to the charging inlet, the downward torque caused by the force applied to the charging inlet by the charging connector and an upward torque caused by the elastic force of the at least one elastic member are balanced, and the normal line of the front surface of the charging inlet stops in a state inclined downwardly from the horizontal line.

6. The charging inlet assembly of claim 5, wherein a first angle between the normal line of the front surface of the charging inlet and the horizontal line at the initial position is smaller than a second angle between the normal line of the front surface of the charging inlet and the horizontal line at a position at which the normal line of the front surface of the charging inlet stops in a state inclined downwardly from the horizontal line.

* * * * *